(12) United States Patent
Tian

(10) Patent No.: US 11,626,747 B2
(45) Date of Patent: Apr. 11, 2023

(54) BATTERY QUICK CHARGING METHOD, DEVICE TO-BE-CHARGED, CHARGING APPARATUS

(71) Applicant: GUANGDONG OPPO MOBILE TELECOMMUNICATIONS CORP., LTD., Guangdong (CN)

(72) Inventor: Chen Tian, Guangdong (CN)

(73) Assignee: GUANGDONG OPPO MOBILE TELECOMMUNICATIONS CORP., LTD., Guangdong (CN)

( * ) Notice: Subject to any disclaimer, the term of this patent is extended or adjusted under 35 U.S.C. 154(b) by 353 days.

(21) Appl. No.: 16/702,742

(22) Filed: Dec. 4, 2019

(65) Prior Publication Data
US 2020/0106286 A1 Apr. 2, 2020

Related U.S. Application Data

(63) Continuation of application No. PCT/CN2018/108569, filed on Sep. 29, 2018.

(51) Int. Cl.
*H02J 7/00* (2006.01)

(52) U.S. Cl.
CPC .... *H02J 7/007194* (2020.01); *H02J 7/00032* (2020.01); *H02J 7/00034* (2020.01);
(Continued)

(58) Field of Classification Search
CPC ............ H02J 7/007194; H02J 7/00032; H02J 7/00034; H02J 7/00036; H02J 7/0047; H02J 7/00714; H02J 7/007182
(Continued)

(56) References Cited

U.S. PATENT DOCUMENTS

| 9,490,642 | B2 * | 11/2016 | Kim | .................. | H02J 7/00712 |
| 2006/0012338 | A1 * | 1/2006 | Etzold | ................. | H02J 7/0069 |
| | | | | | 320/125 |

(Continued)

FOREIGN PATENT DOCUMENTS

| CN | 101636872 | 1/2010 |
| CN | 103107378 | 5/2013 |

(Continued)

OTHER PUBLICATIONS

EPO, Extended European Search Report for EP Application No. 18934526.7, dated Aug. 31, 2020.

(Continued)

*Primary Examiner* — Zixuan Zhou
(74) *Attorney, Agent, or Firm* — Hodgson Russ LLP

(57) ABSTRACT

Provided are a battery quick charging method, a charging apparatus, and a device to-be-charged. The battery quick charging method includes the following. State parameters of a battery of a device to-be-charged are acquired, where the state parameters of the battery include a present temperature of the battery. A charging cut-off voltage corresponding to the present temperature is selected from a target parameter mapping relationship, where the charging cut-off voltage is higher than a rated voltage of the battery. Constant-current charging is performed on the battery until a voltage of the battery reaches the charging cut-off voltage and then performing of the constant-current charging on the battery is stopped.

15 Claims, 3 Drawing Sheets

```
┌─────────────────────────────────────────────────────────────┐
│ ACQUIRE STATE PARAMETERS OF A BATTERY OF A DEVICE TO-BE-    │
│ CHARGED, WHERE THE STATE PARAMETERS OF THE BATTERY          │ — S1
│ INCLUDE A PRESENT TEMPERATURE OF THE BATTERY                │
└─────────────────────────────────────────────────────────────┘
                              │
                              ▼
┌─────────────────────────────────────────────────────────────┐
│ SELECT FROM A TARGET PARAMETER MAPPING RELATIONSHIP A       │ — S2
│ CHARGING CUT-OFF VOLTAGE CORRESPONDING TO THE PRESENT       │
│ TEMPERATURE                                                 │
└─────────────────────────────────────────────────────────────┘
                              │
                              ▼
┌─────────────────────────────────────────────────────────────┐
│ PERFORM A CONSTANT-CURRENT CHARGING ON THE BATTERY UNTIL    │
│ THE VOLTAGE OF THE BATTERY REACHES THE CHARGING CUT-OFF     │ — S3
│ VOLTAGE AND THEN STOP PERFORMING CHARGING ON THE BATTERY    │
└─────────────────────────────────────────────────────────────┘
```

(52) U.S. Cl.
CPC ........ *H02J 7/00036* (2020.01); *H02J 7/0047* (2013.01); *H02J 7/00714* (2020.01); *H02J 7/007182* (2020.01)

(58) Field of Classification Search
USPC .......................................... 320/107, 150–154
See application file for complete search history.

(56) References Cited

U.S. PATENT DOCUMENTS

| | | | | |
|---|---|---|---|---|
| 2010/0327810 | A1* | 12/2010 | Jimbo | H02J 7/007182 320/126 |
| 2011/0037438 | A1* | 2/2011 | Bhardwaj | H02J 7/0071 320/152 |
| 2011/0212769 | A1* | 9/2011 | Carroll | A63F 13/69 463/29 |
| 2011/0215769 | A1* | 9/2011 | Huang | H02J 7/00 320/145 |
| 2017/0207651 | A1* | 7/2017 | Geng | H01M 10/44 |
| 2019/0097432 | A1* | 3/2019 | Du | H01M 4/505 |

FOREIGN PATENT DOCUMENTS

| | | |
|---|---|---|
| CN | 106532834 | 3/2017 |
| CN | 107612075 | 1/2018 |
| JP | H07296853 | 11/1995 |

OTHER PUBLICATIONS

WIPO, ISR for PCT/CN2018/108569, Jul. 5, 2019.
EPO, Communication for EP Application No. 18934526.7, dated Feb. 19, 2021.
IPI, Office Action for IN Application No. 201917049730, dated Oct. 8, 2021.

* cited by examiner

BATTERY QUICK CHARGING METHOD, DEVICE TO-BE-CHARGED, CHARGING APPARATUS

CROSS-REFERENCE TO RELATED APPLICATION

This application is a continuation of International Application No. PCT/CN2018/108569, filed on Sep. 29, 2018, the entire disclosure of which is incorporated herein by reference.

TECHNICAL FIELD

This disclosure relates to the field of charging technology, and more particularly to a battery quick charging method, a charging apparatus, and a device to-be-charged.

BACKGROUND

Currently, a device to-be-charged (such as a smart phone) is enjoying increasing popularity among consumers. In general, however, the device to-be-charged needs to be charged frequently due to high power consumption.

In the related art, charging on a battery mainly includes a trickle stage, a constant-current stage, and a constant-voltage stage, such that the battery will experience no overcurrent in a low-power state and experience no overvoltage in a high-power state. In order to ensure that the battery will experience no overvoltage and be fully charged, the constant-voltage stage will last long, which will affect a charging speed.

SUMMARY

In a first aspect, a battery quick charging method is provided. The quick charging method includes the following. State parameters of a battery of a device to-be-charged are acquired, where the state parameters of the battery include a present temperature of the battery. A charging cut-off voltage corresponding to the present temperature is selected from a target parameter mapping relationship, where the charging cut-off voltage is higher than a rated voltage of the battery. Constant-current charging is performed on the battery until a voltage of the battery reaches the charging cut-off voltage.

In a second aspect, a charging apparatus is provided. The charging apparatus includes a first communication control circuit and a first charging circuit. The first communication control circuit is configured to operate as follows. The first communication control circuit is configured to communicate with a device to-be-charged after the charging apparatus is coupled with the device to-be-charged via a charging interface, to acquire state parameters of a battery of the device to-be-charged, where the state parameters of the battery include a present temperature of the battery. The first communication control circuit is configured to select, from a target parameter mapping relationship, a charging cut-off voltage corresponding to the present temperature, where the charging cut-off voltage is higher than a rated voltage of the battery. The charging apparatus is configured to perform constant-current charging on the battery through the first charging circuit until a voltage of the battery reaches the charging cut-off voltage.

In a third aspect, a device to-be-charged is provided. The device to-be-charged includes a communication control circuit and a charging circuit. The second communication control circuit is configured to operate as follows. The second communication control circuit is configured to acquire state parameters of a battery after the device to-be-charged is coupled with a charging apparatus via a charging interface, where the state parameters of the battery include a present temperature of the battery. The second communication control circuit is configured to select, from a target parameter mapping relationship, a charging cut-off voltage corresponding to the present temperature, where the charging cut-off voltage is higher than a rated voltage of the battery. The second communication control circuit is configured to communicate with the charging apparatus to send the charging cut-off voltage and a voltage of the battery to the charging apparatus, whereby the charging apparatus performs, with the second charging circuit, constant-current charging on the battery until the voltage of the battery reaches the charging cut-off voltage and then stops performing charging on the battery.

In a fourth aspect of the present disclosure, a non-transitory computer readable storage medium is provided. The non-transitory computer readable storage medium is configured to store programs which, when executed by a processor, are operable with the processor to perform the battery quick charging method in the first aspect.

BRIEF DESCRIPTION OF THE DRAWINGS

In order to describe technical solutions of implementations more clearly, the accompanying drawings will be briefly introduced for describing implementations.

DETAILED DESCRIPTION

Figure 1:
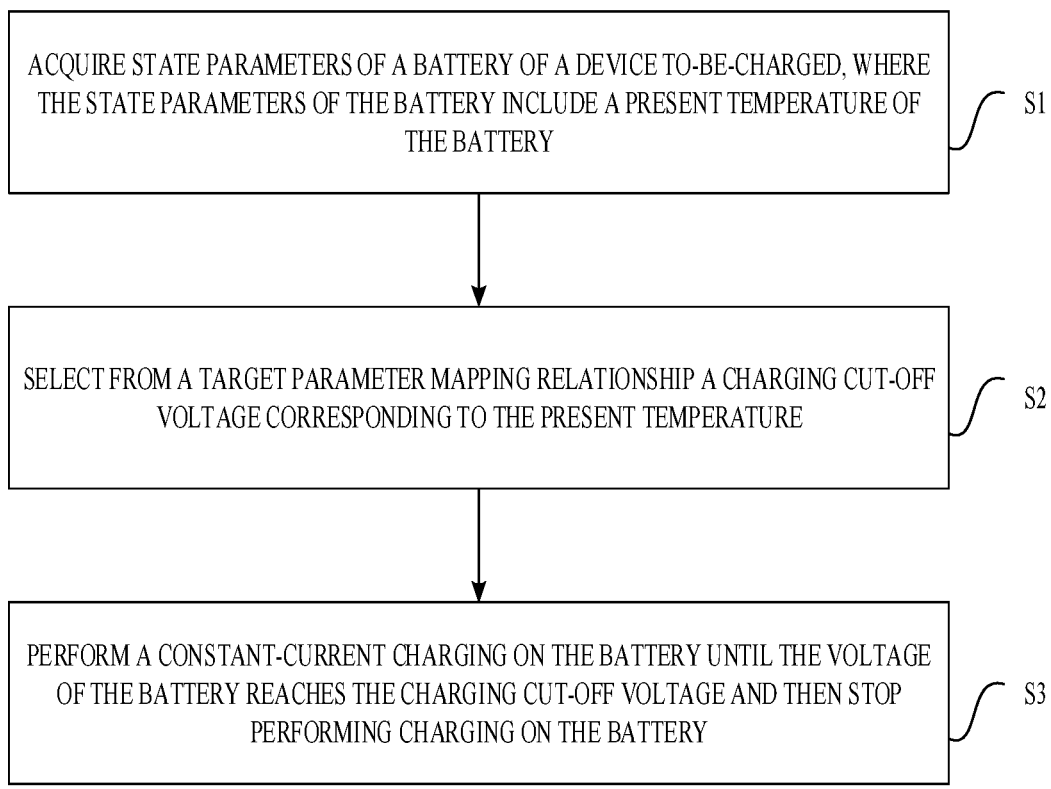
FIG. 1 is a schematic flowchart of a battery quick charging method according to some implementations.

The following will describe implementations in detail, and examples of implementations herein will be illustrated in the accompanying drawings, in which the same or similar reference numerals denote the same or similar components or components having the same or similar functions throughout the context. Implementations described hereinafter with reference to the accompanying drawings are illustrative and intended for explaining, rather than limiting, the present disclosure.

Hereinafter, a battery quick charging method, a charging apparatus, a device to-be-charged, and a charging system according to implementations will be elaborated with reference to the accompanying drawings.

For the battery of the device to-be-charged, in the whole charging period, a longer constant-current charging with a large current will lead to a higher charging speed. According to implementations, in order to increase the charging speed, it is necessary to prolong the constant-current charging as much as possible. Specifically, the battery is overvoltage charged based on a flash fast charging (FFC) algorithm. In other words, a charging cut-off current is increased, such that a voltage of the battery can exceed a rated voltage of the battery, thereby omitting a constant-voltage charging, as long as a float voltage is controlled during charging to ensure that an actual voltage of the battery (VBAT) will not experience overvoltage.

Based on this, according to implementations, a target mapping relationship on parameters (in the following, "target parameter mapping relationship" for short) is established in advance. The target parameter mapping relationship is indicative of a mapping relationship between a temperature of the battery and charging parameters (such as a charging cut-off voltage) of the battery. In practice, according to a present temperature of the battery, present charging parameters corresponding to the present temperature can be selected from the target parameter mapping relationship. Then the constant-current charging on the battery can be controlled according to the present charging parameters. As such, the constant-current charging can be controlled according to state parameters (such as temperature, voltage, or the like) of the battery, which can increase the charging cut-off current and greatly prolong duration of the constant-current charging in which a large current is applied, thereby increasing effectively the charging speed. In addition, the charging cut-off voltage can be adjusted flexibly according to the state parameters of the battery, to avoid damage of the battery due to overvoltage while ensuring that the battery is fully charged.

In the following, a battery quick charging method according to implementations will be described in detail in connection with specific examples. In the quick charging method provided herein, state parameters of a battery of a device to-be-charged are acquired, where the state parameters of the battery include a present temperature of the battery; then a charging cut-off voltage corresponding to the present temperature is selected from a target parameter mapping relationship; a constant-current charging is conducted on the battery until the voltage across the battery reaches the charging cut-off voltage.

FIG. 1 is a schematic flowchart of a battery quick charging method according to some implementations. As illustrated in FIG. 1, the quick charging method begins at block S1.

At block S1, state parameters of a battery of a device to-be-charged are acquired, where the state parameters of the battery include a present temperature of the battery.

It is to be noted that, according to implementations, a charging apparatus can be coupled with a device to-be-charged via a charging interface. After the charging apparatus is coupled with the device to-be-charged via the charging interface, the charging apparatus can communicate with the device to-be-charged. In this situation, the charging apparatus can charge the battery of the device to-be-charged via a power line of the charging interface. The device to-be-charged can communicate with the charging apparatus via a data line of the charging interface. For example, the device to-be-charged is responsible for collecting the state parameters of the battery and sending the state parameters of the battery to the charging apparatus via the data line of the charging interface.

As an example, the device to-be-charged may be a terminal which includes but is not limited to a smart phone, a computer, a personal digital assistant (PDA), a wearable device, a Bluetooth earphone, a gaming device, a camera equipment, and the like. The charging apparatus may be a device for charging the terminal, examples of which include but are not limited to an adaptor, a mobile power pack (that is, power bank), or an on-board charger.

At block S2, a charging cut-off voltage corresponding to the present temperature is selected from a target parameter mapping relationship.

It should be understood that, information indicative of the target parameter mapping relationship may be stored in the charging apparatus or in the device to-be-charged, which depends on whether the charging parameters (for example, the charging cut-off voltage) are determined by the charging apparatus or the device to-be-charged. For example, the device to-be-charged is responsible for collecting the state parameters of the battery and sending the state parameters of the battery to the charging apparatus via the data line of the charging interface. The charging apparatus, which is responsible for determining the charging cut-off voltage, determines the charging cut-off voltage according to the state parameters of the battery and the information indicative of the target parameter mapping relationship stored in the charging apparatus. Alternatively, the device to-be-charged is responsible for determining the charging cut-off voltage. In this situation, in addition to collecting the state parameters of the battery, the device to-be-charged is also responsible for determining the charging cut-off voltage according to the state parameters of the battery and the information indicative of the target parameter mapping relationship stored in the device to-be-charged. Then the device to-be-charged sends the charging cut-off voltage to the charging apparatus.

In addition, the target parameter mapping relationship according to implementations is determined according to variations of an internal resistance of the battery with a temperature of the battery.

In the whole charging process, charging control is performed according to a voltage of the battery detected. Since the battery has an internal resistance such as a direct current (DC) impedance and a polarization impedance, the voltage of the battery will float high during charging, and OCV (open circuit voltage, that is, the voltage of the battery) $=I*r1+VBAT$ (an actual voltage of a battery). Since only the voltage of the battery (OCV) can be measured while the actual voltage of the battery (VBAT) is unable to be measured, in order to ensure that VBAT will not exceed a rated voltage of the battery while ensuring that the battery is fully charged (the battery is determined to be fully charged on condition that VBAT is approximate to the rated voltage of the battery), it is necessary to proceed to a constant-voltage charging to make VBAT≈the rated voltage of the battery.

Through a long-term experiment, inventors of the present application have discovered that in an actual charging process, it is necessary to ensure that the actual voltage of the battery (VBAT) will not exceed the rated voltage of the battery. However, due to existence of the internal resistance of the battery, the voltage of the battery that can be acquired in the charging process also includes a voltage caused by the internal resistance of the battery, and therefore it is difficult to acquire the actual voltage of the battery (VBAT). In other words, besides the actual voltage of the battery (VBAT), the voltage of the battery according to implementations further includes the voltage caused by the internal resistance of the battery.

Figure 2:
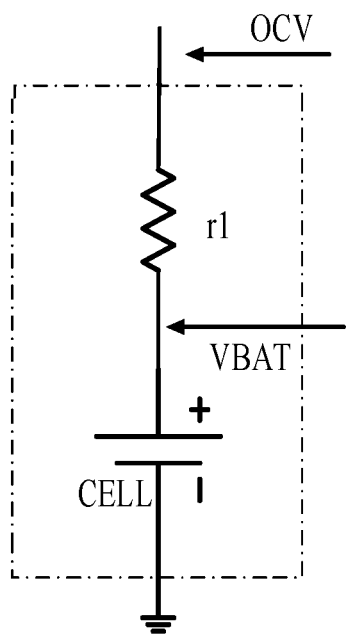
FIG. 2 illustrates an equivalent model of a battery.

Specifically, an equivalent model of the battery is illustrated in FIG. 2. As illustrated in FIG. 2, a voltage of the battery that can be actually detected is the voltage of the battery (OCV). The voltage of the battery includes the actual voltage of the battery and the voltage caused by the internal resistance of the battery. For example, the voltage of the battery (OCV) is equal to a sum of the actual voltage of the battery (VBAT) and the voltage caused by the internal resistance r1 of the battery, that is, $OCV=I*r1+VBAT$, where I represents a real-time current of the battery. In the whole charging period, it is necessary to control a float voltage during charging to ensure that the actual voltage of the battery (VBAT) will not experience overvoltage, that is, to ensure that the actual voltage of the battery (VBAT) is lower than or equal to the rated voltage of the battery.

According to implementations, the charging cut-off voltage is determined based on the variations of the internal resistance of the battery with the temperature of the battery, where the charging cut-off voltage is higher than the rated voltage of the battery. In this way, a charging cut-off current can be increased, such that the battery can be overvoltage charged with a voltage which exceeds the rated voltage of the battery, thereby prolonging greatly the constant-current charging in which a large current is applied.

It is to be noted that, the internal resistance of the battery varies with temperature, and the variations of the internal resistance of the battery with the temperature of the battery can be determined through test. As such, the internal resistance of the battery corresponding to each temperature can be determined according to the variations of the internal resistance of the battery with the temperature of the battery. When the charging cut-off current I1 remains constant, based on a principle that the actual voltage of the battery (VBAT) is lower than or equal to the rated voltage of the battery, a mapping relationship between the temperature of the battery and the charging cut-off voltage can be obtained as the target parameter mapping relationship. As an example, if the constant-current charging is stopped when the actual voltage of the battery (VBAT) reaches the rated voltage, when the charging cut-off current is I1, the charging cut-off voltage corresponding to each temperature can be obtained according to the internal resistance of the battery corresponding to each temperature. For example, the charging cut-off voltage=I1*r1+the rated voltage. The charging cut-off current I1 is a current when the constant-current charging is stopped, which can be set in advance according to actual needs.

As such, after obtaining the variations of the internal resistance of the battery with the temperature of the battery, the mapping relationship between the temperature of the battery and the charging cut-off voltage can be determined based on the variations of the internal resistance of the battery with the temperature of the battery. Different temperatures may correspond to different charging cut-off voltages. The charging cut-off voltage is selected as follows. When the voltage of the battery reaches the charging cut-off voltage, the actual voltage of the battery (VBAT) almost reaches the rated voltage, that is, VBAT≈the rated voltage of the battery.

The charging process is controlled based on the charging cut-off voltage, such that the charging cut-off current can be increased and the battery can be overvoltage charged with a voltage which exceeds the rated voltage, which can not only prolong duration of large current charging to increase the charging speed but also avoid damage of the battery due to overvoltage while fully charging the battery.

In addition, the charging cut-off voltage is in a negative correlation with the present temperature.

It can be understood that, the internal resistance of the battery increases when the temperature is low (lower than room temperature) and decreases when the temperature is high (higher than the room temperature). If a constant charging cut-off voltage is applied, the battery may be unable to be fully charged at a low temperature or may be overcharged at a high temperature. Therefore, on condition that the charging cut-off current remains constant, since the internal resistance of the battery increases at a low temperature, it is necessary to increase the charging cut-off voltage relative to the charging cut-off voltage at the room temperature in order to ensure that the actual voltage of the battery (VBAT) will not experience overvoltage while ensuring that the battery can be fully charged. On the contrary, since the internal resistance of the battery decreases at a high temperature, it is necessary to decrease the charging cut-off voltage relative to the charging cut-off voltage at the room temperature in order to ensure that the actual voltage of the battery (VBAT) will not experience overvoltage while ensuring that the battery can be fully charged.

At block S3, constant-current charging is performed on the battery until the voltage of the battery reaches the charging cut-off voltage that is, stop charging on the battery when the voltage across the battery reaches the charging cut-off voltage.

According to implementations, the charging cut-off voltage is higher than the rated voltage of the battery. The rated voltage of the battery can be specified by a manufacturer of the battery. For example, when the rated voltage of the battery is 4.4V (volt), the charging cut-off voltage can exceed 4.4V, that is, the battery can be charged to have the voltage of the battery reach higher than 4.4V.

It should be understood that, according to implementations, the battery can be charged in a constant-current manner in the whole charging process, and the charging cut-off voltage can be used as a parameter for controlling charging. In other words, a pre-set charging current is applied to the battery for charging to keep a current of the battery at a corresponding charging current. The voltage of the battery is considered during charging. Upon determining that the voltage of the battery reaches the charging cut-off voltage, determine that charging is completed and stop charging on the battery.

As such, according to implementations, the voltage of the battery, instead of the current of the battery, is used for determining whether charging is completed. In other words, when the voltage of the battery reaches the charging cut-off voltage, determine that the actual voltage of the battery (VBAT) nearly reaches the rated voltage. In this way, the constant-voltage charging can be omitted, and whether charging is completed can be determined without performing constant-voltage charging in which a small current is used, such that a charging current when charging is stopped (that is, the charging cut-off current) can be increased and meanwhile a voltage which exceeds the rated voltage can be applied to the battery for overvoltage charging, which is possible to prolong duration of large current charging to increase the charging speed and to avoid damage of the battery due to overvoltage while fully charging the battery.

In some implementations, the constant-current charging on the battery includes multiple constant-current charging stages. The multiple constant-current charging stages are in one-to-one correspondence with multiple charging currents. The constant-current charging is performed on the battery until the voltage of the battery reaches the charging cut-off voltage as follows. In each of the multiple constant-current charging stages, a charging current corresponding to the constant-current charging stage is applied to the battery for constant-current charging. Whether the voltage of the battery has reached the charging cut-off voltage is determined when the charging current decreases to a charging cut-off current. Stop charging the battery upon determining that the voltage of the battery has reached the charging cut-off voltage. Otherwise, if the voltage across the battery has not reached the charging cut-off voltage, continue charging with the charging cut-off current. Generally, the charging current decreases to the charging cut-off current when constant-current charging process proceeds to the last one of the multiple constant-current charging stages That is to say, charging can be performed in the constant-current manner in the whole charging process, with different constant-current charging stages corresponding to different charging currents. In addition, when the constant-current charging is performed, the charging parameters in each constant-current charging stage can include a charging voltage.

As an example, N constant-current charging stages are set in advance, where N is an integer greater than one. The N constant-current charging stages are in one-to-one correspondence with N different charging currents. For example, a first constant-current charging stage to an $N^{th}$ constant-current charging stage correspond to a first charging current to an $N^{th}$ charging current respectively. Specifically, the constant-current charging is performed sequentially from the first constant-current charging stage to the $N^{th}$ constant-current charging stage. The first charging current~the $N^{th}$ charging current decrease in sequence, where the $N^{th}$ charging current is the charging cut-off current. The N constant-current charging stages are in one-to-one correspondence with N different charging voltages. For example, the first constant-current charging stage corresponds to a first charging voltage, and the $N^{th}$ constant-current charging stage corresponds to an $N^{th}$ charging voltage, and the same applies to other constant-current charging stages. The first charging voltage~the $N^{th}$ charging voltage increase in sequence, where the $N^{th}$ charging voltage is the charging cut-off voltage.

In each of the first constant-current charging stage to an $(N-1)^{th}$ constant-current charging stage, a charging current corresponding to each constant-current charging stage is applied to the battery for constant-current charging, and proceed to a subsequent constant-current charging stage when a present voltage of the battery reaches a corresponding charging voltage. In other words, in an $i^{th}$ constant-current charging stage, the current of the battery can be controlled to be an $i^{th}$ charging current corresponding to the $i^{th}$ constant-current charging stage, and the present voltage of the battery can be acquired. When the present voltage of the battery reaches an $i^{th}$ charging voltage corresponding to the $i^{th}$ constant-current charging stage, proceed to an $(i+1)^{th}$ constant-current charging stage, where i=1, . . . , N-1.

In the $N^{th}$ constant-current charging stage, the charging cut-off current is applied to the battery for constant-current charging. Determine that charging on the battery is completed when the present voltage of the battery reaches the charging cut-off voltage and then stop charging, where the charging cut-off current may be 1 A (ampere) or 500 mA (milliampere) and the charging cut-off voltage is higher than the rated voltage of the battery. As such, the charging cut-off current can increase such that a voltage which exceeds the rated voltage can be applied to the battery for overvoltage charging, which is possible to prolong large current charging to increase the charging speed and to avoid damage of the battery due to overvoltage while fully charging the battery.

It can be understood that, in different states of the battery, the charging cut-off current may be the same or different. For example, when the charging cut-off current is different in different states of the battery, multiple charging cut-off currents can be set in advance. When the battery is charged, a corresponding charging cut-off current can be selected to be applied to the battery according to the charging parameters (such as the present temperature) of the battery.

In addition, when the charging cut-off current is different in different states of the battery, the corresponding charging cut-off current can be determined according to the state of the battery, and the target parameter mapping relationship can be determined according to the corresponding charging cut-off current.

In some implementations, the quick charging method further includes the following before selecting, from the target parameter mapping relationship, the charging cut-off voltage corresponding to the present temperature. The charging cut-off current is determined. The target parameter mapping relationship corresponding to the charging cut-off current is selected from multiple pre-established parameter mapping relationships, where the multiple parameter mapping relationships are in one-to-one correspondence with multiple charging cut-off currents, and each of the multiple parameter mapping relationships is indicative of a mapping relationship between the temperature of the battery and the charging cut-off voltage in the case of a charging cut-off current corresponding to the parameter mapping relationship.

That is to say, in order to adjust in real time the charging parameters (such as charging voltage, charging current, etc.) according to the state parameters (such as temperature) of the battery, according to implementations, multiple parameter mapping relationships can be established in advance. The multiple parameter mapping relationships are in one-to-one correspondence with multiple charging cut-off currents. Each of the multiple parameter mapping relationships is indicative of, in the case of the charging cut-off current corresponding to the parameter mapping relationship, the mapping relationship between the temperature of the battery and the charging cut-off voltage.

In practice, based on the charging cut-off current determined, the target parameter mapping relationship corresponding to the charging cut-off current can be selected from the multiple parameter mapping relationships. Then, based on the target parameter mapping relationship, the charging cut-off voltage is determined according to the temperature of the battery.

It should be understood that, information indicative of the multiple parameter mapping relationships may be stored in the charging apparatus or in the device to-be-charged, which depends on whether the charging parameters (for example, the charging cut-off voltage) are determined by the charging apparatus or the device to-be-charged. For example, the device to-be-charged is responsible for collecting the state parameters of the battery and sending the state parameters of the battery to the charging apparatus via the data line of the charging interface. The charging apparatus, which is responsible for determining the charging cut-off voltage, determines the charging cut-off voltage according to the state parameters of the battery and the information indicative of the multiple parameter mapping relationships stored in the charging apparatus. Alternatively, the device to-be-charged is responsible for determining the charging cut-off voltage. In this situation, in addition to collecting the state parameters of the battery, the device to-be-charged is also responsible for determining the charging cut-off voltage according to the state parameters of the battery and the information indicative of the multiple parameter mapping relationships stored in the device to-be-charged. Then the device to-be-charged sends the charging cut-off voltage to the charging apparatus.

In addition, the multiple parameter mapping relationships can also be determined according to variations of the internal resistance of the battery with the temperature of the battery.

For example, in order to determine a parameter mapping relationship corresponding to a certain charging cut-off current, a variation curve of the internal resistance of the battery with the temperature of the battery in the case of the certain charging cut-off current can be first determined. Then the charging cut-off voltage corresponding to each temperature point is selected based on the variation curve of the internal resistance of the battery with the temperature of the battery. The charging cut-off voltage can be selected as follows. When the voltage of the battery reaches the charging cut-off voltage, the actual voltage of the battery is approximate to the rated voltage of the battery.

As such, the constant-voltage charging can be omitted, as long as the actual voltage of the battery does not experience overvoltage. In this way, the charging cut-off current can increase such that a voltage which exceeds the rated voltage can be applied to the battery for overvoltage charging, which is possible to prolong large current charging to increase the charging speed and to avoid damage of the battery due to overvoltage while fully charging the battery.

Hereinafter, the charging apparatus and the device to-be-charged according to implementations will be elaborated in connection with FIG. 3 and FIG. 4. It should be understood that, technical terms and features related to apparatus implementations are similar to those related to method implementations. For the sake of simplicity, repeated descriptions are properly omitted.

Figure 3:
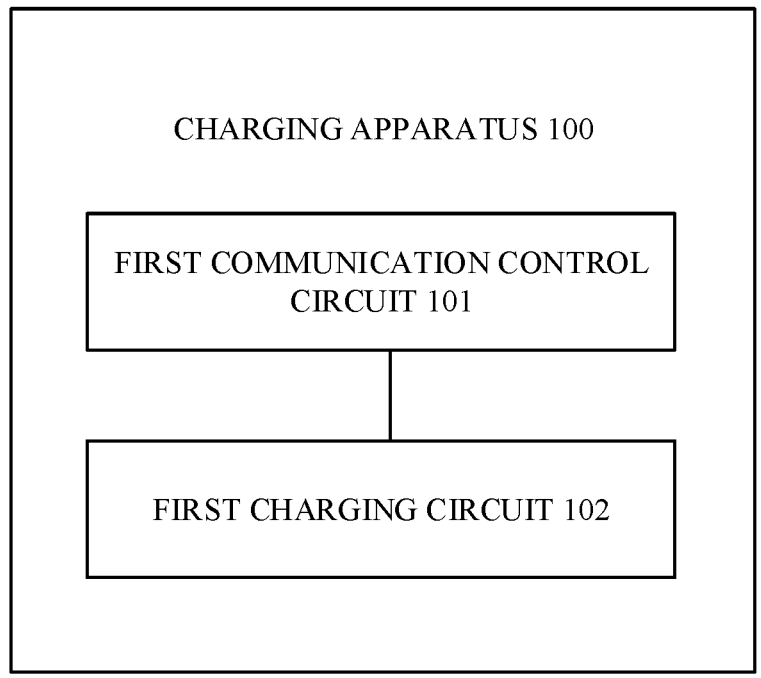
FIG. 3 is a schematic structural diagram of a charging apparatus according to some implementations.

FIG. 3 is a schematic structural diagram of a charging apparatus according to some implementations. As illustrated in FIG. 3, the charging apparatus 100 includes a first communication control circuit 101 and a first charging circuit 102. The first communication control circuit 101 is configured to operate as follows. The first communication control circuit 101 is configured to communicate with a device to-be-charged after the charging apparatus 100 is coupled with the device to-be-charged via a charging interface, to acquire state parameters of a battery of the device to-be-charged, where the state parameters of the battery include a present temperature of the battery. The first communication control circuit 101 is configured to select, according to a target parameter mapping relationship, a charging cut-off voltage corresponding to the present temperature, where the charging cut-off voltage is higher than a rated voltage of the battery. The charging apparatus 100 is configured to perform constant-current charging on the battery through the first charging circuit 102 until a voltage of the battery reaches the charging cut-off voltage and then stop performing charging on the battery.

In some implementations, the voltage of the battery includes at least an actual voltage of the battery and a voltage caused by an internal resistance of the battery, where the actual voltage of the battery is lower than or equal to the rated voltage of the battery.

In some implementations, the target parameter mapping relationship is determined according to variations of an internal resistance of the battery with a temperature of the battery.

In some implementations, the charging cut-off voltage is in a negative correlation with the present temperature. The "negative correlation" means that the charging cut-off voltage increases as the temperature decreases or the charging cut-off voltage decreases as the temperature increases.

In some implementations, the constant-current charging on the battery includes multiple constant-current charging stages. The multiple constant-current charging stages are in one-to-one correspondence with multiple charging currents. In each of the multiple constant-current charging stages, the charging apparatus 100 is configured to perform the constant-current charging on the battery according to a charging current corresponding to the constant-current charging stage. The first communication control circuit 101 is configured to determine whether the voltage of the battery has reached the charging cut-off voltage, when the charging current decreases to a charging cut-off current. The charging apparatus 100 is configured to stop charging on the battery when the first communication control circuit 101 determines that the voltage of the battery has reached the charging cut-off voltage.

In some implementations, the first communication control circuit 101 is further configured to operate as follows. Before selecting, according to the target parameter mapping relationship, the charging cut-off voltage corresponding to the present temperature, the first communication control circuit 101 is configured to determine the charging cut-off current and select, from multiple pre-established parameter mapping relationships, the target parameter mapping relationship corresponding to the charging cut-off current, where the multiple parameter mapping relationships are in one-to-one correspondence with multiple charging cut-off currents, and each of the multiple parameter mapping relationships is indicative of a mapping relationship between a temperature of the battery and the charging cut-off voltage, based on a charging cut-off current corresponding to the parameter mapping relationship.

In the charging apparatus 100 provided herein, the first communication control circuit 101 is configured to select, according to the target parameter mapping relationship, the charging cut-off voltage corresponding to the present temperature, where the charging cut-off voltage is higher than the rated voltage of the battery. The charging apparatus 100 is configured to perform, through the first charging circuit 102, the constant-current charging on the battery until the voltage of the battery reaches the charging cut-off voltage and then stop charging on the battery. As such, duration of the constant-current charging in which a large current is applied can be prolonged to increase the charging speed. In addition, the charging cut-off voltage can be flexibly adjusted according to the temperature of the battery, which is possible to avoid damage of the battery due to overvoltage while ensuring that the battery is fully charged.

Figure 4:
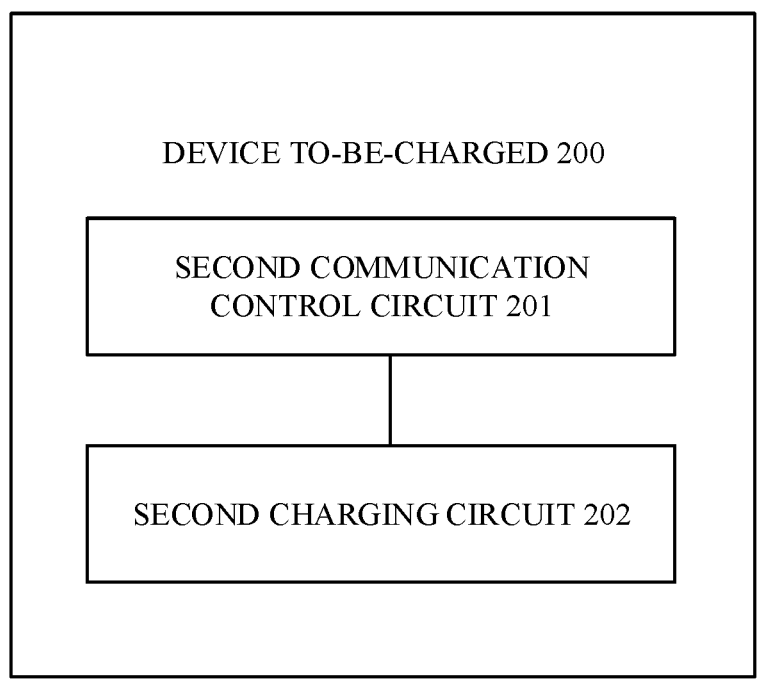
FIG. 4 is a schematic structural diagram of a device to-be-charged according to some implementations.

FIG. 4 is a schematic structural diagram of a device to-be-charged according to some implementations. As illustrated in FIG. 4, the device to-be-charged 200 includes a second communication control circuit 201 and a second charging circuit 202. The second communication control circuit 201 is configured to operate as follows. The second communication control circuit 201 is configured to acquire state parameters of a battery after the device to-be-charged 200 is coupled with a charging apparatus via a charging interface, where the state parameters of the battery include a present temperature of the battery. The second communication control circuit 201 is configured to select, according to a target parameter mapping relationship, a charging cut-off voltage corresponding to the present temperature, where the charging cut-off voltage is higher than a rated voltage of the battery. The second communication control circuit 201 is configured to communicate with the charging apparatus to send the charging cut-off voltage and a voltage of the battery to the charging apparatus, whereby the charging apparatus performs, through the second charging circuit 202, constant-current charging on the battery until the voltage of the battery reaches the charging cut-off voltage and then stops charging on the battery.

In some implementations, the voltage of the battery includes at least an actual voltage of the battery and a voltage caused by an internal resistance of the battery, where the actual voltage of the battery is lower than or equal to the rated voltage of the battery.

In some implementations, the target parameter mapping relationship is determined according to variations of an internal resistance of the battery with a temperature of the battery.

In some implementations, the charging cut-off voltage is in a negative correlation with the present temperature.

In some implementations, the constant-current charging on the battery includes multiple constant-current charging stages. The multiple constant-current charging stages are in one-to-one correspondence with multiple charging currents. The second communication control circuit 201 is configured to operate as follows. The second communication control circuit 201 is configured to send a charging current corresponding to each of the multiple constant-current charging stages to the charging apparatus, whereby the charging apparatus performs, in each of the multiple constant-current charging stages, a charging current corresponding to the constant-current charging stage is applied to the battery for the constant-current charging. The second communication control circuit 201 is configured to send a charging cut-off current and the charging cut-off voltage to the charging apparatus, whereby the charging apparatus determines whether the voltage of the battery has reached the charging cut-off voltage when the charging current decreases to the charging cut-off current and stops charging on the battery upon determining that the voltage of the battery has reached the charging cut-off voltage.

In some implementations, the second communication control circuit 201 is further configured to operate as follows. Before selecting, according to the target parameter mapping relationship, the charging cut-off voltage corresponding to the present temperature, the second communication control circuit 201 is configured to determine the charging cut-off current and select, from multiple pre-established parameter mapping relationships, the target parameter mapping relationship corresponding to the charging cut-off current, where the multiple parameter mapping relationships are in one-to-one correspondence with multiple charging cut-off currents, and each of the multiple parameter mapping relationships is indicative of a mapping relationship between a temperature of the battery and the charging cut-off voltage concerning a charging cut-off current corresponding to the parameter mapping relationship.

In the device to-be-charged 200 provided herein, the second communication control circuit 201 is configured to select, according to the target parameter mapping relationship, the charging cut-off voltage corresponding to the present temperature, where the charging cut-off voltage is higher than the rated voltage of the battery. The second communication control circuit 201 is configured to send the charging cut-off voltage to the charging apparatus, whereby the charging apparatus performs the constant-current charging on the battery until the voltage of the battery reaches the charging cut-off voltage and then stops charging. In this way, the constant-current charging in which a large current is applied can be prolonged to increase the charging speed. In addition, the charging cut-off voltage can be flexibly adjusted according to the temperature of the battery, which is possible to avoid damage of the battery due to overvoltage while ensuring that the battery is fully charged.

Figure 5:
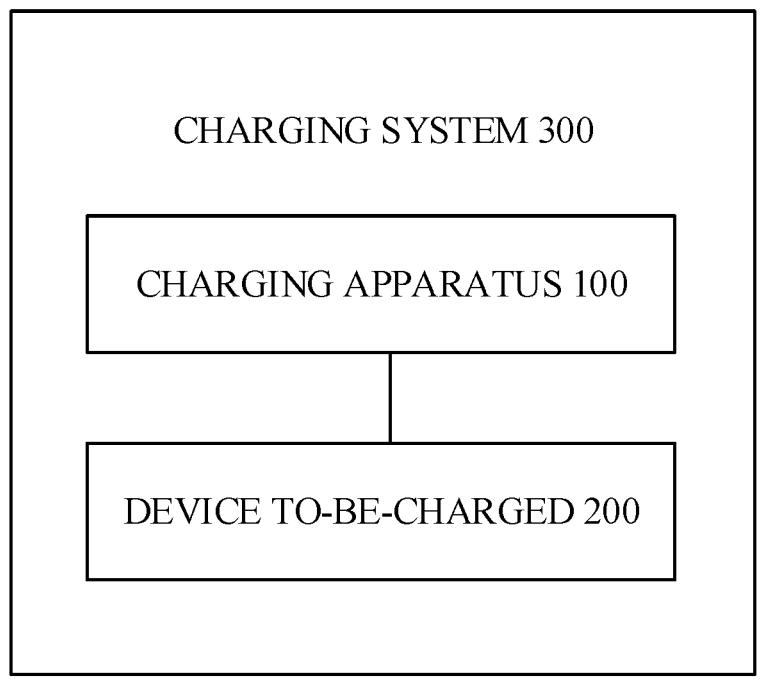
FIG. 5 is a schematic structural diagram of a charging system according to some implementations.

FIG. 5 is a schematic structural diagram of a charging system according to some implementations. As illustrated in FIG. 5, the charging system 300 includes the charging apparatus 100 illustrated in FIG. 3 and the device to-be-charged 200 illustrated in FIG. 4.

In the charging system provided herein, the constant-current charging in which a large current is applied can be prolonged and a constant-voltage charging can be shortened, thereby increasing the charging speed. In addition, the charging cut-off voltage can be flexibly adjusted according to the temperature of the battery, which is possible to avoid damage of the battery due to overvoltage while ensuring that the battery is fully charged.

Implementations further provide a non-transitory computer readable storage medium. The non-transitory computer readable storage medium is configured to store quick charging programs for a battery which, when executed by a processor, are operable with the processor to perform the above battery quick charging method.

Those of ordinary skill in the art will appreciate that units and algorithmic operations of various examples described in connection with implementations herein can be implemented by electronic hardware or by a combination of computer software and electronic hardware. Whether these functions are performed by means of hardware or software depends on the application and the design constraints of the associated technical solution. Those skilled in the art may use different methods with regard to each particular application to implement the described functionality, but such methods should not be regarded as lying beyond the scope of the disclosure.

It will be evident to those skilled in the art that, for the sake of convenience and simplicity, in terms of the working processes of the foregoing systems, apparatuses, and units, reference can be made to the corresponding processes of the above method implementations, which will not be repeated herein.

It will be appreciated that the systems, apparatuses, and methods disclosed in implementations herein may also be implemented in various other manners. For example, the above apparatus implementations are merely illustrative, e.g., the division of units is only a division of logical functions, and there may exist other manners of division in practice, e.g., multiple units or assemblies may be combined or may be integrated into another system, or some features may be ignored or skipped. In other respects, the coupling or direct coupling or communication connection as illustrated or discussed may be an indirect coupling or communication connection through some interface, device or unit, and may be electrical, mechanical, or otherwise.

Separated units as illustrated may or may not be physically separated. Components or parts displayed as units may or may not be physical units, and may reside at one location or may be distributed to multiple networked units. Some or all of the units may be selectively adopted according to practical needs to achieve desired objectives of the disclosure.

Additionally, various functional units described in implementations herein may be integrated into one processing unit or may be present as a number of physically separated units, and two or more units may be integrated into one.

If the integrated units are implemented as software functional units and sold or used as standalone products, they may be stored in a non-transitory computer readable storage medium. Implementations provide a non-transitory computer readable storage medium. The non-transitory computer readable storage medium is configured to store programs which, when executed by a processor, are operable with the processor to perform the battery quick charging method. Based on such an understanding, the essential technical solution, or the portion that contributes to the prior art, or part of the technical solution of the disclosure may be embodied as software products. The computer software products can be stored in a storage medium and may include multiple instructions that, when executed, can cause a computing device, e.g., a personal computer, a server, a network device, etc., to execute some or all operations of the methods described in various implementations. The above storage medium may include various kinds of media that can store program codes, such as a universal serial bus (USB) flash disk, a mobile hard drive, a read-only memory (ROM), a random access memory (RAM), a magnetic disk, or an optical disk.

While the disclosure has been described in connection with certain embodiments, it is to be understood that the disclosure is not to be limited to the disclosed embodiments but, on the contrary, is intended to cover various modifications and equivalent arrangements included within the scope of the appended claims, which scope is to be accorded the broadest interpretation so as to encompass all such modifications and equivalent structures as is permitted under the law.

What is claimed is:

1. A battery quick charging method, comprising:
   acquiring state parameters of a battery of a device to-be-charged, wherein the state parameters of the battery comprise a present temperature of the battery;
   selecting, from a target parameter mapping relationship, a charging cut-off voltage corresponding to the present temperature, wherein the charging cut-off voltage is higher than a rated voltage of the battery; and
   performing constant-current charging on the battery until a voltage of the battery reaches the charging cut-off voltage and then stopping charging on the battery;
   wherein the constant-current charging on the battery comprises a plurality of constant-current charging stages, the plurality of constant-current charging stages are in one-to-one correspondence with a plurality of charging currents, and performing the constant-current charging on the battery until the voltage of the battery reaches the charging cut-off voltage comprises:
   in each of the plurality of constant-current charging stages, applying a charging current corresponding to the constant-current charging stage to the battery for the constant-current charging;
   determining whether the voltage of the battery has reached the charging cut-off voltage when the charging current decreases to a charging cut-off current; and
   stopping performing the constant-current charging on the battery upon determining that the voltage of the battery has reached the charging cut-off voltage.

2. The battery quick charging method of claim 1, wherein the voltage of the battery comprises at least an actual voltage of the battery and a voltage caused by an internal resistance of the battery, wherein the actual voltage of the battery is lower than or equal to the rated voltage of the battery.

3. The battery quick charging method of claim 1, wherein the target parameter mapping relationship is determined according to variations of an internal resistance of the battery with a temperature of the battery.

4. The battery quick charging method of claim 1, wherein the charging cut-off voltage is in a negative correlation with the present temperature.

5. The battery quick charging method of claim 1, further comprising:

before selecting, according to the target parameter mapping relationship, the charging cut-off voltage corresponding to the present temperature,
determining the charging cut-off current; and
selecting, from a plurality of pre-established parameter mapping relationships, the target parameter mapping relationship corresponding to the charging cut-off current, wherein the plurality of parameter mapping relationships are in one-to-one correspondence with a plurality of charging cut-off currents, and each of the plurality of parameter mapping relationships is indicative of a mapping relationship between a temperature of the battery and the charging cut-off voltage in the case of a charging cut-off current corresponding to the parameter mapping relationship.

6. A charging apparatus, comprising:
   a communication control circuit configured to:
     communicate with a device to-be-charged after the charging apparatus is coupled with the device to-be-charged via a charging interface, to acquire state parameters of a battery of the device to-be-charged, wherein the state parameters of the battery comprise a present temperature of the battery; and
     select, from a target parameter mapping relationship, a charging cut-off voltage corresponding to the present temperature, wherein the charging cut-off voltage is higher than a rated voltage of the battery; and
   a charging circuit through which the charging apparatus is configured to perform, constant-current charging on the battery until a voltage of the battery reaches the charging cut-off voltage and then stop charging on the battery;
   wherein the constant-current charging on the battery comprises a plurality of constant-current charging stages, the plurality of constant-current charging stages are in one-to-one correspondence with a plurality of charging currents, and wherein:
     the charging apparatus is configured to, in each of the plurality of constant-current charging stages, apply, through the charging circuit, a charging current corresponding to the constant-current charging stage for constant-current charging;
     the communication control circuit is further configured to determine whether the voltage of the battery has reached the charging cut-off voltage when the charging current decreases to a charging cut-off current; and
     the charging apparatus is configured to stop performing the constant-current charging on the battery upon the communication control circuit determines that the voltage of the battery has reached the charging cut-off voltage.

7. The charging apparatus of claim 6, wherein the voltage of the battery comprises at least an actual voltage of the battery and a voltage caused by an internal resistance of the battery, wherein the actual voltage of the battery is lower than or equal to the rated voltage of the battery.

8. The charging apparatus of claim 6, wherein the target parameter mapping relationship is determined according to variations of an internal resistance of the battery with a temperature of the battery.

9. The charging apparatus of claim 6, wherein the charging cut-off voltage is in a negative correlation with the present temperature.

10. The charging apparatus of claim 6, wherein the communication control circuit is further configured to:

before selecting, according to the target parameter mapping relationship, the charging cut-off voltage corresponding to the present temperature,
determine the charging cut-off current; and
select, from a plurality of pre-established parameter mapping relationships, the target parameter mapping relationship corresponding to the charging cut-off current, wherein the plurality of parameter mapping relationships are in one-to-one correspondence with a plurality of charging cut-off currents, and each of the plurality of parameter mapping relationships is indicative of a mapping relationship between a temperature of the battery and the charging cut-off voltage in the case of a charging cut-off current corresponding to the parameter mapping relationship.

11. A device to-be-charged, comprising:
a charging circuit; and
a communication control circuit configured to:
acquire state parameters of a battery after the device to-be-charged is coupled with a charging apparatus via a charging interface, wherein the state parameters of the battery comprise a present temperature of the battery;
select, from a target parameter mapping relationship, a charging cut-off voltage corresponding to the present temperature, wherein the charging cut-off voltage is higher than a rated voltage of the battery; and
communicate with the charging apparatus to send the charging cut-off voltage and a voltage of the battery to the charging apparatus, wherein the charging apparatus is configured to perform, through the charging circuit, constant-current charging on the battery until the voltage of the battery reaches the charging cut-off voltage and then stops charging on the battery;
wherein the constant-current charging on the battery comprises a plurality of constant-current charging stages, the plurality of constant-current charging stages are in one-to-one correspondence with a plurality of charging currents, and the communication control circuit is configured to:
send a charging current corresponding to each of the plurality of constant-current charging stages to the charging apparatus, wherein the charging apparatus is configured to perform, in each of the plurality of constant-current charging stages, a charging current corresponding to the constant-current charging stage is applied to the battery for the constant-current charging; and
send a charging cut-off current and the charging cut-off voltage to the charging apparatus, wherein the charging apparatus is configured to determine whether the voltage of the battery has reached the charging cut-off voltage when the charging current decreases to the charging cut-off current and stops charging on the battery upon determining that the voltage of the battery has reached the charging cut-off voltage.

12. The device to-be-charged of claim 11, wherein the voltage of the battery comprises at least an actual voltage of the battery and a voltage caused by an internal resistance of the battery, wherein the actual voltage of the battery is lower than or equal to the rated voltage of the battery.

13. The device to-be-charged of claim 11, wherein the target parameter mapping relationship is determined according to variations of an internal resistance of the battery with a temperature of the battery.

14. The device to-be-charged of claim 11, wherein the charging cut-off voltage is in a negative correlation with the present temperature.

15. The device to-be-charged of claim 11, wherein the communication control circuit is further configured to:
before selecting, from the target parameter mapping relationship, the charging cut-off voltage corresponding to the present temperature,
determine the charging cut-off current; and
select, from a plurality of pre-established parameter mapping relationships, the target parameter mapping relationship corresponding to the charging cut-off current, wherein the plurality of parameter mapping relationships are in one-to-one correspondence with a plurality of charging cut-off currents, and each of the plurality of parameter mapping relationships is indicative of a mapping relationship between a temperature of the battery and the charging cut-off voltage in the case of a charging cut-off current corresponding to the parameter mapping relationship.

* * * * *